United States Patent [19]

Dunn et al.

[11] Patent Number: 5,379,804
[45] Date of Patent: Jan. 10, 1995

[54] PIPE FITTING COVER

[76] Inventors: Victor S. Dunn, 76B Phelps Ave., New Brunswick, N.J. 08901;
Raymond J. Bruno, 2 Sugar Mill Rd., Belle Mead, N.Y. 08502

[21] Appl. No.: 971,883
[22] Filed: Nov. 5, 1992
[51] Int. Cl.$^6$ ............................................. F16L 55/00
[52] U.S. Cl. ......................... 138/104; 138/92; 138/149; 138/157
[58] Field of Search ............... 138/104, 157, 149, 103, 138/178, 36, 92; 116/208, 276

[56]  References Cited

U.S. PATENT DOCUMENTS

| | | | |
|---|---|---|---|
| 1,894,295 | 1/1933 | Scandore | 138/104 |
| 2,604,229 | 7/1952 | Schwarz | 138/92 |
| 2,682,828 | 7/1954 | Pawley | 116/276 |
| 3,248,946 | 5/1966 | Lichtenberg et al. | 116/276 |
| 3,307,590 | 3/1967 | Carlson | 138/149 |
| 3,732,894 | 5/1973 | Botsolas | 138/178 |
| 3,888,205 | 6/1975 | Vitticore et al. | 116/276 |
| 3,911,959 | 10/1975 | Frank | 138/36 |
| 3,913,625 | 10/1975 | Gazda et al. | 138/145 |
| 3,922,999 | 12/1975 | Meginnis | 116/208 |
| 3,948,295 | 4/1976 | Lemont et al. | 138/149 |
| 4,667,505 | 5/1987 | Sharp | 138/104 |
| 4,704,983 | 11/1987 | Rung | 116/276 |
| 5,039,598 | 8/1991 | Abramsohn et al. | 430/347 |
| 5,076,198 | 12/1991 | Bottum | 116/276 |

Primary Examiner—Timothy F. Simone
Assistant Examiner—James F. Hook

[57]  ABSTRACT

A pipe fitting cover is provided for covering a pipe fitting which has been covered with insulation. The pipe fitting cover is a flexible, resilient, sheet formed in a shape generally corresponding to the external shape of the pipe fitting and larger than the external shape of the pipe fitting to accommodate insulation between the pipe fitting and the pipe fitting cover. The sheet has a hole intermediate the ends of the sheet. A clear window insert is secured in the hole whereby insulation covered by the pipe fitting cover can be viewed with the pipe fitting cover in place on the pipe fitting.

11 Claims, 1 Drawing Sheet

PIPE FITTING COVER

BACKGROUND OF THE INVENTION

The present invention relates generally to pipe fitting covers and more particularly to certain new and unique improvements in pipe fitting covers for insulated pipe fittings which permit the insulation covered by the pipe fitting cover to be viewed after the pipe fitting cover has been installed on the pipe fitting.

In many industrial and commercial applications piping carrying either hot or cold fluids or gases is insulated to maintain the fluid or gas within the piping at its desired temperature, to keep the piping from heating or cooling its surroundings and/or to keep the piping from injuring someone through contact. Intermediate 90 and 45 degree bends, tee fittings, valves and other pipe fittings of the piping system, the piping is normally insulated with formed fiber glass insulation. The 90 and 45 degree bends, the tee fittings, the valves and other pipe fittings are insulated by wrapping the pipe fitting in a batt or blanket of fiber glass insulation. The fiber glass blanket is covered by a plastic sheet known as a pipe fitting cover.

Once the pipe fitting cover is installed over the fiber glass insulation, the existence or nonexistence of the fiber glass insulation under the pipe fitting cover can not be determined by a visual inspection. This has resulted in a significant problem. Certain insulation applicators, to save time and/or material costs, merely install the pipe fitting covers and fail to install the fiber glass insulation blanket on the pipe fittings.

If the pipe fitting temperatures exceed 150 degrees Fahrenheit and the pipe fittings are not properly insulated, the plastic pipe fitting covers can be damaged by the heat. If the pipe fitting temperatures are cold and the pipe fittings are not properly insulated, the insulation on the piping adjacent the pipe fittings can be damaged by the moisture which accumulates due to the condensation of moisture on the improperly insulated pipe fittings.

Presently, there are two methods used to determine whether or not the pipe fittings have been insulated. One method involves removing the installed pipe fitting covers to visually inspect the pipe fittings. Obviously, this method is accurate but it is both time consuming and costly. Another method involves squeezing the pipe fitting covers. This can be accomplished quickly, but fiber glass insulation blankets are soft and it is hard to determine with accuracy whether or not any fiber glass insulation is under the pipe fitting cover by squeezing the covers.

SUMMARY OF THE INVENTION

The present invention provides a means for accurately and rapidly determining whether or not fiber glass insulation blanket has been installed on a pipe fitting without removing the pipe fitting cover. This is accomplished by providing an aperture in the pipe fitting cover intermediate the ends of the pipe fitting cover and installing a clear viewing insert or window in the aperture. The clear viewing window is made of plastic or rubber and preferably snaps into place to form a water tight seal with the aperture. For plastic covers, the plastic or rubber used for the clear viewing insert or window must have chemical resistance, temperature and ultraviolet ray resistance characteristics substantially similar to those exhibited by the material of the pipe fitting cover.

DESCRIPTION OF THE PREFERRED EMBODIMENTS

Figure 1:
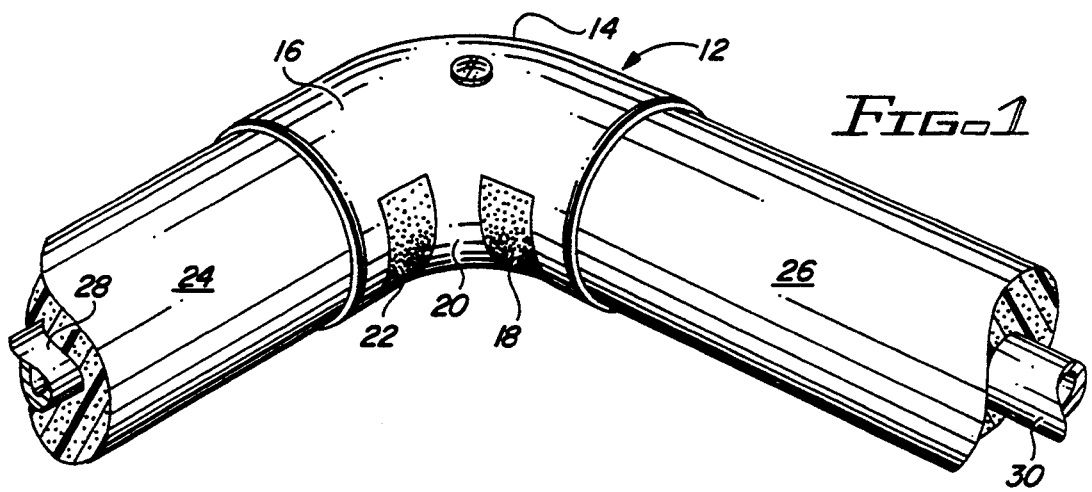
FIG. 1 is a perspective view of a pipe fitting cover of the present invention, with a clear viewing window, installed about an elbow joint pipe fitting.

FIG. 1 shows a 90 degree elbow pipe fitting cover 12 of the present invention installed on an insulated pipe fitting. The pipe fitting cover 12 is a sheet of flexible, resilient, opaque material (normally nonmetallic) folded to form a curved segment 14 and two tubular sections 16 and 18. The side edge portions of the pipe fitting cover overlap at 20 and are held together by adhesive tape 22 or other retaining means.

The tubular sections 16 and 18 overlap the ends 24 and 26 of formed insulation jacketing on piping runs 28 and 30. Adhesive tape can be wrapped around and adhered to the ends of tubular sections 16 and 18 and the adjacent ends 24 and 26 of the formed insulation jacketing to form a water tight seal.

Figure 2:
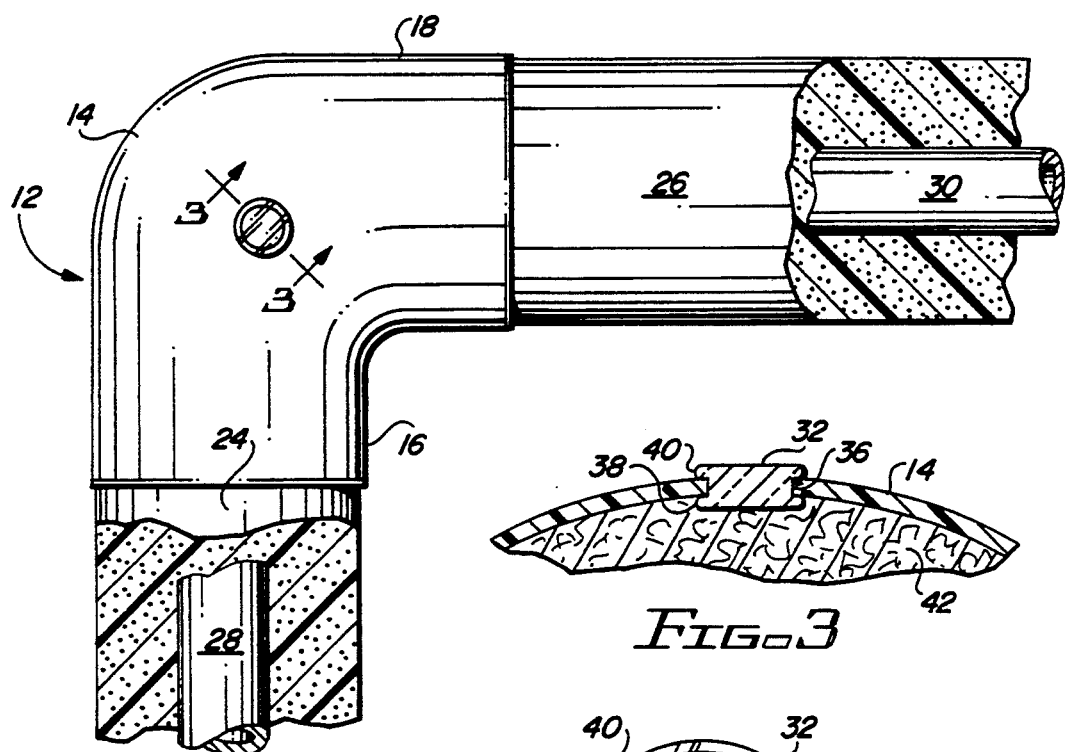
FIG. 2 is a side elevational view of the pipe fitting cover of the present invention installed on an elbow joint pipe fitting.
Figure 3:
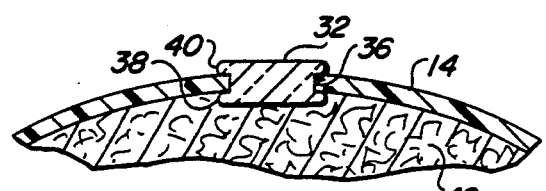
FIG. 3 is a partial section taken along lines 3—3 of FIG. 2 illustrating the clear viewing window insert in cross-section.
Figure 4:
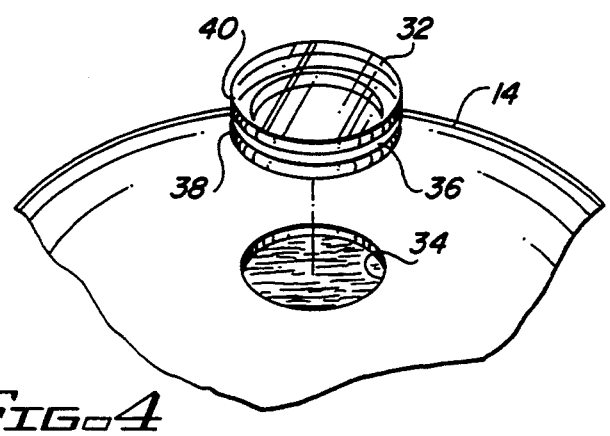
FIG. 4 is an exploded perspective view of the clear viewing window insert and the hole in the pipe fitting cover which receives the clear viewing window insert.

As best shown in FIGS. 2, 3 and 4, the central curved segment 14 of the pipe fitting cover is provided with a clear viewing window insert 32 mounted in a hole 34 of the pipe fitting cover 12. The clear viewing window 32 is circular in configuration to correspond to the configuration of the hole 34.

The clear viewing window 32 is provided with a groove 36 about its circumference having a diameter corresponding to the diameter of the hole 34 and a width corresponding to the thickness of the material of the pipe fitting cover 12. The groove 36 is defined by a pair of circular ribs 38 and 40 which each have a diameter greater than the diameter of the hole 34 so that the clear viewing window will snap into place in the hole 34 and form a water tight seal with the pipe fitting cover.

With the clear viewing window 32, the fiber glass insulation blanket 42 wrapped about the pipe fitting can be viewed after the pipe fitting cover 12 has been installed on the pipe fitting. For example, if the fiber glass insulation blanket is yellow, the viewing window is yellow. Thus, it can be easily determined, even at a distance, whether or not insulation has been installed under the pipe fitting cover without removing the pipe fitting cover 12.

Most pipe fitting covers 12 are made from polyvinyl chloride sheets or other materials such as silicon rubber or various other polymers such as polycarbonate, polysulfone, polyethylene terephthalate and polyurethane. The covers 12 can also be made from aluminum or stainless steel. The clear viewing window 32 can be made of silicon rubber, polyvinyl chloride or other materials possessing the chemical resistance, temperature characteristics and ultraviolet ray resistance corresponding to the material of the pipe fitting cover.

The term "clear" viewing windows as used herein also includes translucent viewing windows provided the windows are clear enough to see the color of the insulation installed under the pipe fitting cover 12. While the invention has been shown on a 90 degree elbow pipe fitting cover, the clear viewing window 32 can be used on other pipe fitting covers for 45 degree elbows, tee pipe fittings, valves and other pipe fittings. In all of these pipe fitting covers, the clear viewing windows 32 are located in the central portion of the pipe fitting cover between the tubular end sections, corresponding to tubular sections 16 and 18, that extend out to overlap the formed insulation on the piping runs.

What is claimed is:

1. A pipe fitting cover for covering a pipe fitting which has been covered with insulation comprising:
   a sheet of flexible, resilient, opaque, material having a shape generally corresponding to the external shape of the pipe fitting and larger than the external shape of the pipe fitting to accommodate insulation between the pipe fitting and the pipe fitting cover, the sheet having a hole therein having a substantially circular configuration and dimensions, the hole being located approximately midway between ends of the sheet; and
   a clear window secured in the hole whereby insulation covered by the pipe fitting cover can be viewed with the pipe fitting cover in place on the pipe fitting; the clear window comprising an insert having a substantially annular groove corresponding in dimensions and configuration to the dimensions and configuration of the hole; the groove being defined by inner and outer ribs having configurations corresponding to the configuration of the hole and dimensions greater than the dimensions of the hole whereby the ribs extend beyond the hole and in conjunction with the groove form a snap fit, water tight seal with the sheet.

2. The pipe fitting cover of claim 1 wherein the sheet has a shape generally corresponding to the external shape of an elbow pipe fitting.

3. The pipe fitting cover of claim 1 wherein the sheet and the window are polymeric materials.

4. The pipe fitting cover of claim 1 wherein the sheet is polyvinyl chloride and the window is clear silicon rubber.

5. The pipe fitting cover of claim 1 wherein the sheet a polymeric material and the window is clear silicon rubber.

6. The pipe fitting cover of claim 1 wherein the sheet is polycarbonate and the window is clear silicon rubber.

7. The pipe fitting cover of claim 1 wherein the sheet is polysulfone and the window is clear silicon rubber.

8. The pipe fitting cover of claim 1 wherein the sheet is polyethylene terephthalate and the window is clear silicon rubber.

9. The pipe fitting cover of claim 1 wherein the sheet is polyurethane and the window is clear silicon rubber.

10. The pipe fitting cover of claim 1 wherein the sheet is aluminum and the window is clear silicon rubber.

11. The pipe fitting cover of claim 1 wherein the sheet is stainless steel and the window is clear silicon rubber.

* * * * *